No. 713,772. Patented Nov. 18, 1902.
E. KEMPSHALL.
PLAYING BALL.
(Application filed Aug. 7, 1902.)
(No Model.)

Witnesses:
Herbert J. Smith
B.C. Stickney

Inventor:
Eleazer Kempshall
By his Attorney
F.H. Richards

UNITED STATES PATENT OFFICE.

ELEAZER KEMPSHALL, OF BOSTON, MASSACHUSETTS.

PLAYING-BALL.

SPECIFICATION forming part of Letters Patent No. 713,772, dated November 18, 1902.

Application filed August 7, 1902. Serial No. 118,790. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Playing-Balls, of which the following is a specification.

This invention relates to playing-balls, and its object is to improve the construction thereof.

Figure 1:
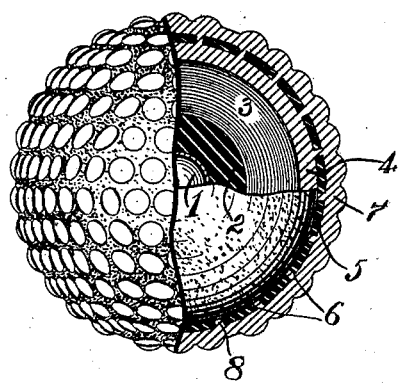
Figure 2:
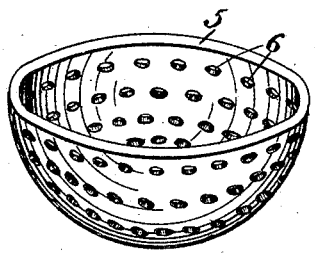

In the drawings forming part of this specification, Figure 1 is a view, partly in section, of a ball made in accordance with my present improvements; and Fig. 2 is a perspective view of a perforated hemisphere of hard rubber used in forming a shell or cover of the ball.

At the center of the ball I use a small shell 1, preferably of steel, which I cover with a soft-rubber layer 2, this forming a relatively small ball. Upon this I wind rubber 3 under tension, preferably in the form of thin wide strips of "surgeon's rubber" or acid-cured rubber. I then apply a sphere or shell 4 of gutta-percha and then a shell 5, of hard rubber, provided throughout with perforations 6, and the whole I inclose in a gutta-percha layer 7, which is applied under heat and compression, so that the gutta-percha works into the perforations 6, as at 8, and the two gutta-percha layers 4 and 7 are thus united and form a substantial cover, which is stiffened or reinforced by the hard-rubber layer 5, and which preferably holds the filling 3 under compression. Metal or celluloid may be used for the shell 5 if desired.

It will be observed that the metal shell 1 at the center of the ball forms a hard center piece which, owing to its hollow form, is not above the requisite weight. This center piece is not liable to go out of shape or become uncentered by reason of the pressure exerted by the windings 3 of rubber strip nor by reason of the additional pressure to which it is subjected at the operation of forming the shell 7 upon the ball, and it will be seen that the ball throughout is of such quality as to resist distortion under a light blow, while being very active when given a heavy blow, so that it is well adapted for the requirements of the game of golf.

It will be observed that the sphere 5, of hard rubber, is embedded in the sphere of gutta-percha, consisting of the united layers 4 and 7; that the ball comprises a metal center piece, a layer or shell thereon at least a portion whereof consists of tense windings 3 of rubber, and a wear-resisting cover 7; that the soft-rubber members 2 and 3 form the principal bulk or portion of the ball, and that owing to the presence of the soft rubber and the windings thereon of surgeon's rubber and to the lightness of the steel shell 1 and of the gutta-percha and hard-rubber elements the ball will float in water, the gutta-percha and the material 3 being of less specific gravity than water.

Having described my invention, I claim—

1. A playing-ball comprising a metal center piece, a layer of solid soft rubber thereon, tense windings of rubber upon said solid rubber layer, and a gutta-percha shell within which is embedded a perforated shell of hard rubber.

2. A playing-ball comprising a hollow metal center piece, a layer of solid soft rubber thereon, tense windings of surgeon's rubber upon said soft rubber, a gutta-percha layer upon said windings, a perforated hard-rubber shell upon said gutta-percha, and a gutta-percha shell upon said hard rubber.

ELEAZER KEMPSHALL.

Witnesses:
FRED. J. DOLE,
B. C. STICKNEY.